DEFLECTION YOKE

Filed May 26, 1950 2 Sheets-Sheet 1

INVENTOR.
CARLO V. BOCCIARELLI
BY
Brown, Denk & Synnestvedt
AGENTS

Oct. 9, 1951 C. V. BOCCIARELLI 2,570,425

DEFLECTION YOKE

Filed May 26, 1950 2 Sheets-Sheet 2

INVENTOR.
CARLO V. BOCCIARELLI
BY
Brown, Denk & Synnestvedt
AGENTS

Patented Oct. 9, 1951 2,570,425

UNITED STATES PATENT OFFICE 2,570,425

DEFLECTION YOKE

Carlo V. Bocciarelli, Philadelphia, Pa., assignor to Philco Corporation, Philadelphia, Pa., a corporation of Pennsylvania Application May 26, 1950, Serial No. 164,465

9 Claims. (Cl. 313—76)

The present invention relates to a high-efficiency deflection yoke which is especially suitable for use in television receivers. The yoke to be described herein not only provides for wide-angle deflection of the cathode-ray beam with maximum utilization of the available scanning power, but in addition maintains sharp focus over an image raster area which is characterized by being almost completely free from distortions arising within the image-reproducing tube itself, such, for example, as those due to undesired non-uniformities in the deflecting field distribution.

Recent developments in the design of television receiving apparatus indicate a trend toward the use of cathode-ray tubes possessing relatively large viewing surfaces. With tubes of standard construction, having a predetermined maximum angle through which the cathode-ray beam is normally deflected, such an increase in viewing area necessitates a proportionate increase in the overall dimensions of the tube envelope.

Practical restrictions on the allowable depth for the cabinet housing the television assembly, however, have caused many designers to consider these large-screen cathode-ray tubes with a view toward reducing their length. Such a decrease in tube size would permit a number of economies in the manufacture of television receiving apparatus, as well as in the fabrication and distribution of the tubes themselves.

In order to avoid a reduction in raster area while at the same time reducing the overall length of the tube, however, it is necessary to increase the deflection angle. This angle frequently reaches 70° in tubes now being manufactured, and it would be desirable to raise it still further to 90°. To deflect the cathode-ray beam through these large angles, however, a considerable increase in scanning power is customarily required. The problem is therefore presented of providing a deflection yoke which will produce the necessary wide-angle deflection without requiring a greater amount of deflecting power than is available in television receivers of standard design.

One object of the invention, therefore, is to provide a highly efficient deflecting yoke for use with cathode-ray tubes to effect relatively large deflections of the electron beam in response to a relatively small amount of energy supplied to the yoke.

Another object of the invention is to provide a deflecting yoke particularly adapted for use with cathode-ray tubes which are of relatively short overall length but which have relatively large viewing screens, such as are particularly adapted for use in home television receivers.

A further object of the invention is to provide a deflecting yoke in accordance with the preceding objectives in which the tendency to distort the shape of the image produced on the viewing screen is minimized.

An additional object is to provide a deflecting yoke in accordance with the preceding objectives in which the tendency to distort the cross-section of the electron beam deflected by the yoke is minimized.

In order to utilize the available deflecting energy to the highest possible degree, the magnetic field produced by the deflection yoke should be at a maximum throughout the region of the cathode-ray tube in which deflection is carried out. It therefore follows that certain conditions must be satisfied in order for a deflection yoke to operate with maximum efficiency, or in other words, for the greatest possible deflection force to be exerted on the electrons of the scanning beam at each point in the course of their journey through the deflecting region. Perhaps the principal requirement to be met is that the turns of the coils forming the yoke should be so disposed and configured that they are always in close proximity to the electrons of the scanning beam, since this results in the production of the highest possible magnetic field intensity at each point and hence the application of a maximum deflecting force to the beam electrons.

As the scanning beam occupies a position progressively more distant from the electron gun, it is deflected away from the axis of the cathode-ray tube by an amount which increases throughout the yoke region, and becomes a maximum at the point where the beam emerges from the influence of the yoke. This condition imposes a limitation on the proximity of the turns of the coil windings to the path of the undeflected cathode-ray beam, since the yoke must be designed so that at no point in the course of the traversal of the deflection region by the electron beam will the conductors which form the yoke lie in the path of the beam and thereby interfere with the movement of the electrons. Since any such interference is most likely to occur under conditions of maximum beam deflection, it will be seen that the shape of the yoke is primarily determined by the path which the electron beam will follow in its maximum deflected state.

In designing a yoke structure which utilizes to the fullest possible extent the applied deflecting power, and hence permits wide-angle cathode-ray tubes to be employed in television receivers with substantially no modification of the deflecting circuits, it is thus necessary that the yoke windings, in the region where the electron beam enters the influence of the deflecting field, be in close proximity to the scanning beam electrons without actually being interposed in the beam path. If the yoke in this region has a predetermined number of turns, and is supplied with a predetermined amount of power, it will exert at a given point a certain calculable force upon the electrons in the beam. This in turn will determine the position which will be occupied by the electrons in the beam at some subsequent point in their journey, the latter in turn determining how close the yoke windings may be placed to the beam at this second point without actually lying in the electron path. By a similar process, the location of the electron beam at some still later time may be determined, which again yields the optimum position of the yoke winding. By following this procedure, the actual path of the electron beam under such conditions may be obtained, and a yoke configuration determined which permits the most efficient utilization of the scanning energy developed by the deflection circuits of the television receiver.

The above stated relationship between the configuration of the yoke and the path of a beam electron traversing the magnetic field produced thereby may also be expressed mathematically as:

$$x=\frac{e^k}{y}\int\frac{ue^{\frac{u}{\epsilon}}du^2}{\sqrt{V_0^2-u^2}}$$

where $x$=instantaneous position of electron along axis of CRT from point of entry into deflecting field region $y$=instantaneous radial displacement of electron from axis of CRT $V_0$=velocity of electron at point of entry $\epsilon=\frac{e_0}{m_0}$ (charge to mass ratio of electron at point of entry)

$u=\epsilon\log y-\epsilon\log y_0+V_0$ $y_0$=radial displacement of electron from axis of CRT at point of entry into deflecting field region This equation is soluble by numerical and graphical integration, and will be substantially satisfied if the displacement of the turns of the yoke from the longitudinal axis of the cathode-ray tube (which coincides substantially with the axis of the undeflected cathode-ray beam) is related to the displacement along such axis measured from the point of entry of the beam into the yoke in accordance with a hyperbolic function.

While the above equation represents the ideal configuration of the yoke structure, it will be understood that substantial advantages in accordance with the present invention may be obtained even though certain departures are made from such an ideal condition. These departures may be necessitated by practical considerations such, for example, as the fact that in most instances it is desirable to dispose the deflecting yoke externally of an envelope of glass or other material which encloses various elements of the cathode-ray tube within an evacuated region. Thus, in practice, the turns of the yoke windings may be so configured as to define a surface of revolution which intersects a plane passing through the longitudinal axis of the yoke in two curves each of which is substantially a sector of a circle. However, any configuration of the yoke windings which outlines a surface of revolution such that the intersection between such surface and a plane passing through the longitudinal axis of the yoke defines two curves each of which is convex to the said longitudinal axis will yield some of the benefits in accordance with this invention.

It should be noted, however, that the present invention does not require in every embodiment that the surface defined by the turns of the yoke be a surface of revolution. As will be brought out in the following description, the principles of the invention apply in certain modifications to a yoke the inner surface of which intersects a plane normal to the longitudinal axis of the cathode-ray tube in such a manner as to form a rectangle.

Turning now to another feature of applicant's invention, it is known in the art that when certain types of standard cylindrical deflecting yokes are used in conjunction with cathode-ray tubes having substantially flat viewing surfaces, the raster traced on the tube screen by the scanning beam is subject to a particular type of distortion commonly referred to as "pin-cushioning." Such standard yokes include those in which a cosinusoidal variation of the circumferential turns distribution is maintained between the extremities of each coil, so that a substantially uniform electromagnetic field is produced throughout the deflecting region. It is furthermore known in the art that this pin-cushion distortion may in some cases be substantially eliminated by the creation of a non-uniform field in one portion of the deflecting region, this being brought about by a suitable variation in the circumferential distribution of the active turns of the windings of the yoke along its longitudinal axis. For example, the circumferential distribution of the turns of a standard cylindrical yoke may be cosinusoidal in one longitudinal section of the yoke, and may be other than cosinusoidal in another section. In other words, in order to correct for raster distortion produced in a flat-faced tube, at least some portion of the field within the yoke must be made non-uniform.

However, when attempts are made to eliminate pin cushioning by a modification of the circumferential distribution of the turns of the yoke along its longitudinal axis, there is produced a deformation of the normally circular cross-section of the electron scanning beam, such that the spot of light produced on the viewing screen by the beam is highly irregular in outline. Expressed differently, an attempt to remedy the nonlinear shape of the image raster has heretofore resulted in a serious defocusing of the cathode-ray beam, this defocusing being due to the non-uniformity of the electromagnetic field in that longitudinal section of the yoke where the circumferential winding distribution is other than cosinusoidal.

The above will be appreciated when it is considered that, in a yoke of cylindrical configuration, the magnetic field intensity is substantially the same throughout the length of the yoke. Furthermore, any non-uniformity of field distribution produces a distorting effect which is proportional to the magnitude of the field intensity. Since with a cylindrical yoke the ratio between the yoke diameter and the diameter of the cathode-ray beam is substantially constant throughout the deflecting region, approximately the same amount of distortion in beam cross-section will be introduced regardless of which particular portion of the yoke produces the non-uniform field.

It has been found that pin-cushion distortion of the image raster may be corrected in a yoke designed in accordance with the present disclosure, while at the same time avoiding any appreciable defocusing of the cathode-ray scanning beam or any marked change in its circular outline. This is made possible by the fact that in the flared yoke according to the invention the field intensity varies throughout the length of the yoke, being lower at the exit end than at the entry end. Thus the turns of the windings of the yoke, in one embodiment, may be so distributed circumferentially near the end of the yoke where the beam enters the deflecting region as to produce a magnetic field which is substantially uniform and substantially free from appreciable variations in a direction transverse to the yoke axis. This may be accomplished, for example, by constructing this portion of the yoke so that it is of substantially cylindrical outline and is provided with an appropriate turns distribution. As brought out above, however, this will not result in any substantial correction for pin cushioning of the image raster. On the other hand, such a field will likewise not produce any appreciable distortion of the beam cross-section.

Now, since the yoke diameter in the exit region is greater than its diameter in the entry region, the distribution of the turns of the windings in the former section may be modified in such a manner as to bring about a correction for the pin-cushioning effect. While it might be expected that a modification of the distribution of the turns in this portion of the yoke would likewise tend to produce a non-uniformity in the magnetic field distribution to such a degree that the cathode-ray scanning beam cross-section would be distorted, this has not proven to be the case. The reason why such a non-uniformity in field distribution near the exit end of the yoke is not objectionable appears to be that the intensity of the field produced within this portion of the yoke is considerably less than it is in the entry portion. Therefore, while there is a variation in field intensity throughout the cross-section of the cathode-ray beam, it is by no means as great as would be produced by a variation in field intensity in the entry portion of the yoke. In practice, it has been found that a non-uniform field in the exit portion of this particular form of yoke structure tends to produce substantially negligible distortion in the beam cross-section, and has substantially no deleterious effect on beam focusing. Thus it will be seen that such a flared yoke is inherently capable of providing for correction of raster distortion with less deformation of beam cross-section than is possible with a conventional cylindrical yoke.

Although the variation in turns distribution from one end of the yoke to the other depends in part upon the magnitude of the correcting effect desired, it has been found that one particularly suitable form of yoke employs a turns distribution for each pair of oppositely-disposed deflecting coils such that in transverse cross-section the concentration of the turns is a maximum at two points approximately 180° apart, with a progressive decrease from either of these points to a minimum at points angularly spaced approximately 90° to the points of maximum concentration, the yoke being further characterized in that there is a variation in the circumferential turns distribution throughout the length of each coil, this distribution being approximately proportional to the cosine of the increasing angle measured from the points of maximum number at one end of the coil in a plane normal to the longitudinal axis of the yoke, and being approximately proportional to the cosine squared of the increasing angle measured from the points of maximum number at the other end of the coil in a plane parallel to the first-mentioned plane.

Figures 1, 3, 4, 6, 7:
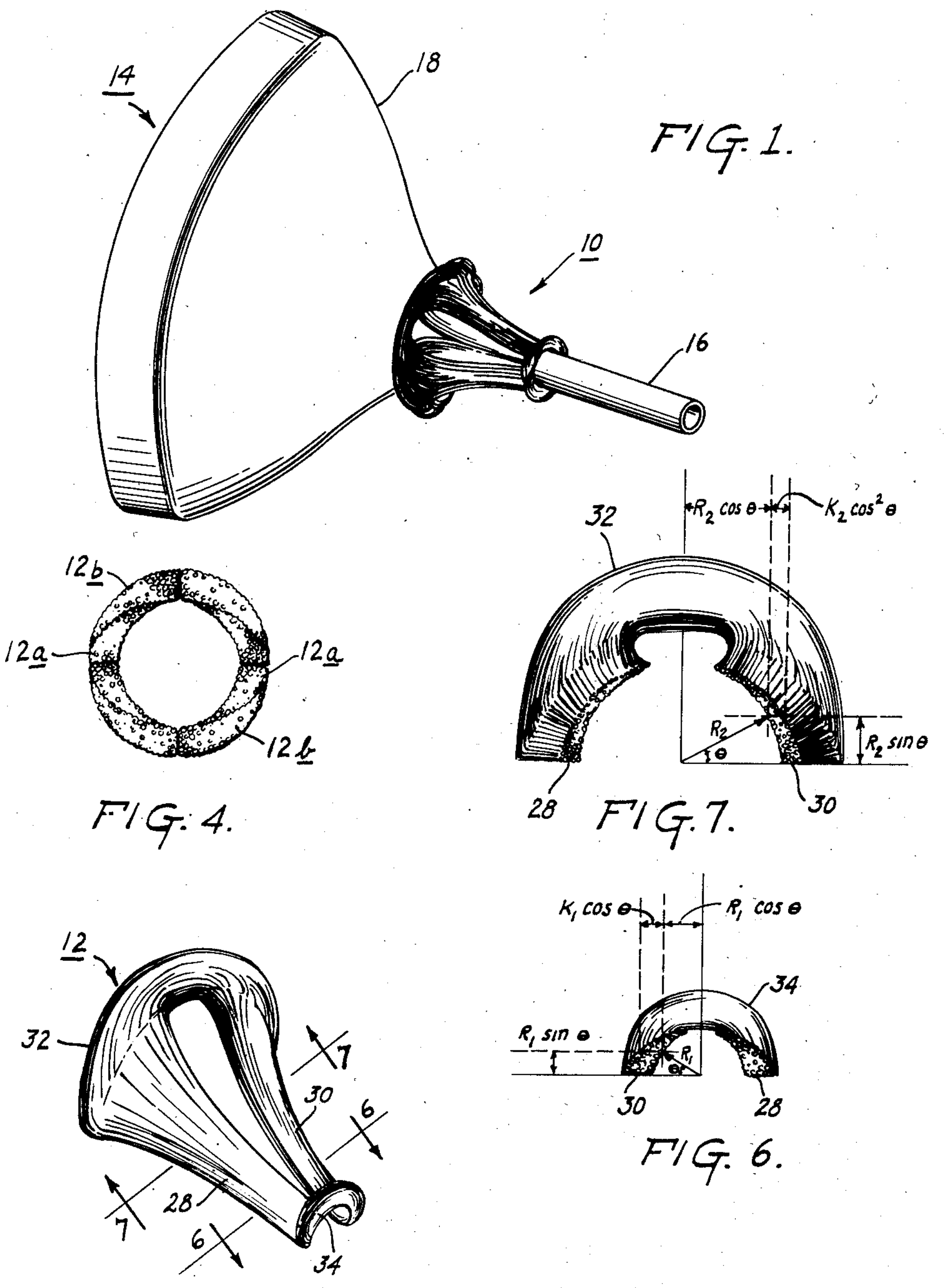
Figure 1 is a perspective view of one form of high-efficiency deflection yoke designed in accordance with the present invention, together with a cathode-ray tube suitable for use therewith.
Figure 3 is a perspective view of one of the coil windings which make up the yoke of Figure 1.
Figure 4 is an illustration, in cross-section, of the manner in which four of the coil windings of Figure 3 are employed so as to form the complete yoke assembly of Figure 1.
Figure 5:
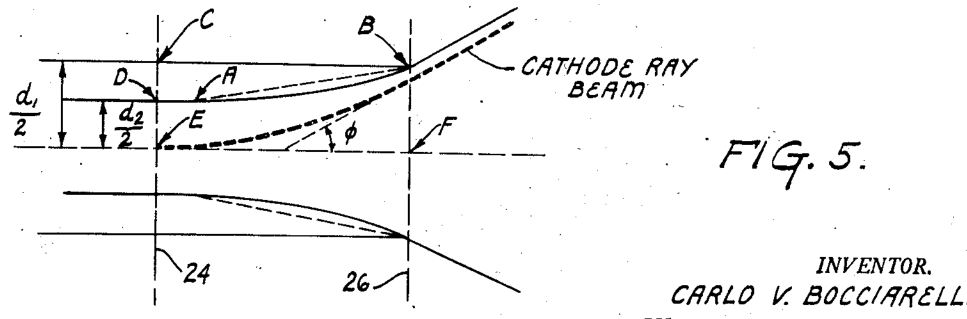

Figure 5 illustrates graphically how the deflection efficiency of applicant's yoke compares to that of a yoke of standard construction; and Figures 6 and 7 are cross-sectional views of the coil winding of Figure 3 taken along the lines 6—6 and 7—7, respectively.

Referring now to the illustrated embodiment of applicant's invention, there is shown in Figure 1 a deflection yoke 10 composed of four individual coils, one of which is illustrated in perspective in Figure 3. Each coil (identified by the reference numeral 12) is formed with lumped windings, two oppositely-disposed horizontal coils 12*a* being placed next to the glass wall of a cathode-ray tube 14, and two oppositely-disposed vertical coils 12*b* being wound over the horizontal coils 12*a*, as illustrated in Figure 4. In this manner the respective electromagnetic fields produced by energization of the coils are substantially mutually perpendicular.

Considering now the cathode-ray tube generally designated by the reference numeral 14 in Figure 1, it will be seen that this tube is formed with a cylindrical neck 16 and a bulb portion 18. The yoke 10, as illustrated, covers a small section of the neck 16 and substantially all of the transition zone between that portion of the tube and the bulb 18.

Figure 2:
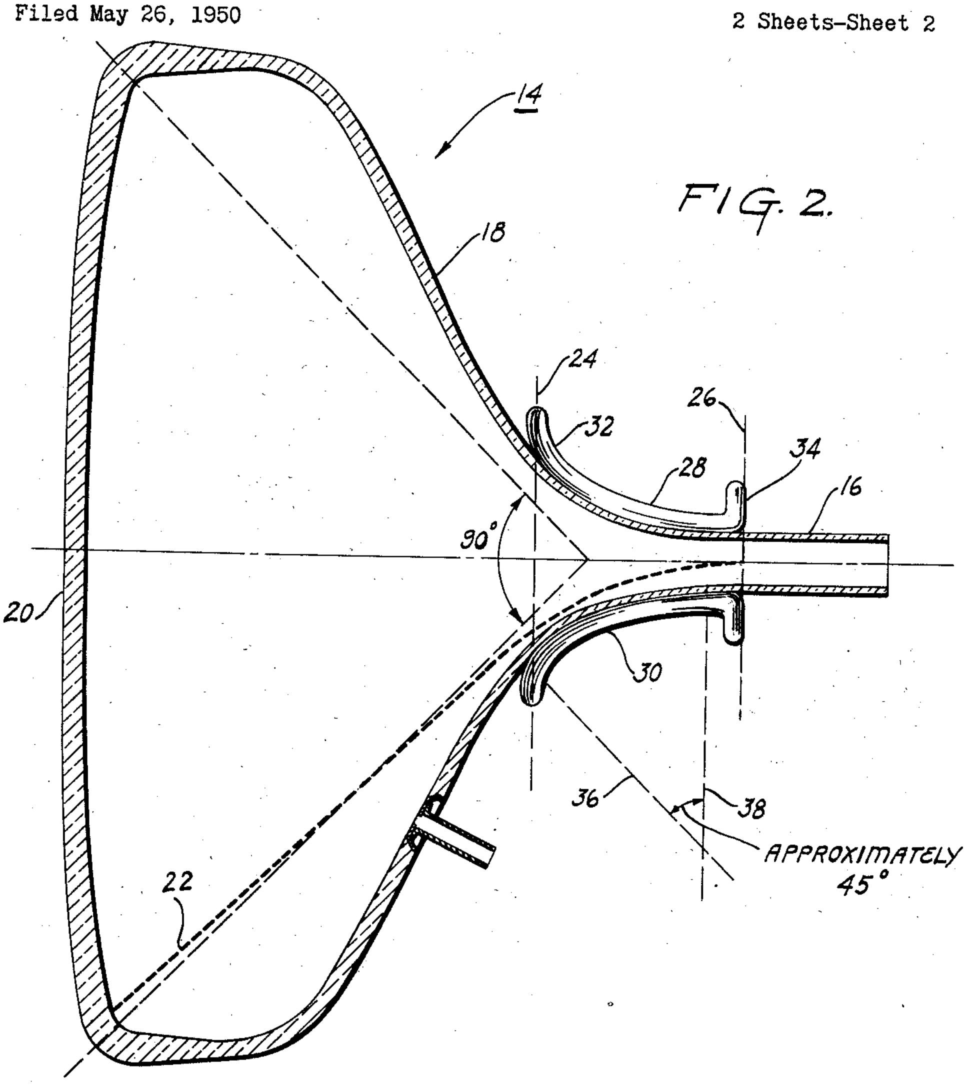
Figure 2 is an axial cross-section of the cathode-ray tube of Figure 1, together with a plan view of one of the deflecting coil windings showing the manner in which the latter is associated with the tube.

Figure 2 illustrates the cathode-ray tube 14 in greater detail. It will be noted that the tube is provided with a substantially flat face 20, on which an image raster is intended to be formed as a result of the impingement of the cathode-ray scanning beam 22 on the fluorescent screen of the tube. The beam is developed by an electron gun (not shown) and selectively deflected by the action of magnetic fields produced by the yoke 10.

In order to develop on the fluorescent screen of the tube 14 an image raster which utilizes to the maximum possible extent the available viewing area, the cathode-ray scanning beam 22 is deflected through an angle of approximately 90°, as indicated in Figure 2. To obtain the maximum benefits from such a wide-angle deflection, while at the same time utilizing to the maximum possible extent the available scanning power developed by the television receiver and employed to energize the windings of the yoke 10, the latter is constructed so that its inner surface is of a particular configuration. To fully comprehend the nature of this configuration, it should be understood that the deflecting region of the cathode-ray tube, or in other words, that portion of the tube within which the deflecting action of the yoke 10 is effective, lies substantially between the boundaries indicated by the reference numerals 24 and 26 in Figure 2. Accordingly, the deflecting yoke 10 of Figure 1 may be slipped over the cylindrical neck portion 16 of the cathode-ray tube 14 until it rests in the position shown in Figure 1—that is, until it lies substantially between the boundaries 24 and 26 indicated in Figure 2.

Each coil unit 12 is formed by two side conductors 28 and 30 and two end conductors 32 and 34. Furthermore, the inner surface of each coil unit 12 (that portion which contacts the glass wall of the cathode-ray tube 14) is of constantly increasing diameter over a greater part of the distance between the end conductors 32 and 34. In order that this condition may obtain, it is necessary that the configuration of the two side conductors 28 and 30 vary constantly throughout substantially the full length of the unit. Furthermore, the end conductors 32 and 34, when the coil is placed in position upon the cathode-ray tube, are bent upwardly away from the tube surface (see especially Figure 2). As is well known in the art, such an upward bending of the end conductors of a yoke causes their influence on the scanning beam to be considerably lessened, and hence any objectionable field distortions produced by these end conductors are greatly minimized.

Referring now particularly to Figure 2, it will be appreciated that the inner surface of the yoke 10, as exemplified by the cross-sectional shape of the cathode-ray tube, is a surface of revolution such that the intersection of such surface and a plane passing through the longitudinal axis of the yoke defines two curves each of which is convex to such longitudinal axis throughout at least a major portion of the yoke length. In the illustrated embodiment, the yoke has an inner surface which intersects such a plane in two curves which are the sectors of a circle. The angle subtended between the limits of curvature 36, 38 of the yoke is approximately 45°, as shown, the remainder of the yoke which lies between the limit 38 and the boundary line 26 being substantially cylindrical. As previously mentioned, however, the curvature of the inner surface of the yoke is determined point-by-point through a consideration of the path taken by the scanning beam 22 in response to the deflecting action of the particular field established at each point in the yoke region, and then determining the optimum location for the yoke surface from successive positions of the scanning beam after it has been deflected by each such field. Ideally this will yield a yoke the inner surface of which is a surface of revolution whose generatrix is defined by the equation hereinbefore given, which surface is closely approximated by a hyperboloid of revolution. In practice, however, it has been found desirable to modify this result in the face of certain manufacturing and commercial considerations, so that the approximation illustrated in Figure 2 wherein the inner surface of the yoke intersects a longitudinal plane in two curves which are approximately sectors of a circle has been found to yield benefits which are only slightly less than could be obtained under theoretically optimum conditions. In any event, it will be noted that the distance of the yoke side conductors 28 and 30 from the scanning beam 22 is a minimum at all points within the yoke region defined by the boundaries 24 and 26. In other words, the separation of the yoke conductors from the scanning beam is never appreciably greater between such boundary lines than it is at the point within the cylindrical neck 16 where the beam 22 enters the yoke influence.

Accordingly, each deflecting coil 12 comprises a plurality of turns of wire arranged in the form of lumped conductors, each of the two side conductors 28 and 30 of the coil being generally longitudinally disposed with reference to a common axis but being spaced a greater distance from this axis and from the remaining conductor at one end thereof than at the other, each of the side conductors 28 and 30 also being bent convexly with respect to this axis throughout at least a portion of its length, and with each of the two end conductors 32 and 34 of the coil being disposed substantially transversely with respect to such axis so that the end conductors exert relatively less deflecting effect than the side conductors.

Figure 5 illustrates the reason why a yoke constructed in accordance with the teachings of Figures 1 through 4 provides greatly increased efficiency over that provided by a conventionl yoke of cylindrical form. In setting forth the advantages obtainable by the use of applicant's invention, it may be stated that the general expression for the force on an electron moving in a magnetic field is $$F=e(\overline{V}\times\overline{H}) \qquad (1)$$

where $e$=charge on the electron $\overline{V}$=velocity vector $\overline{H}$=flux density vector $\overline{V}\times\overline{H}=VH \sin (V, H)$ Since the force acting on the electron is always at right angles to the direction of motion, it follows that if the initial velocity of the particle is perpendicular to H, then the path traced out will be the arc of a circle. Thus, equating the centripetal force to the force of the magnetic field yields for the radius of the path $$r=\frac{mV}{He} \qquad (2)$$

where $m$=mass of the electron.

From the geometry of the path of the electron through the deflecting field, it follows that $$\sin \phi=\frac{l}{r} \qquad (3)$$

where $\phi$=½ the deflection angle $l$=length of the deflecting field

By substituting (2) in (3), and using the fact that by close approximation $$|\overline{V}|=\sqrt{\frac{2E_b e}{m}} \qquad (4)$$

where $E_b$=accelerating anode potential the following expression is finally arrived at:

$$\sin \phi=Hl\sqrt{\frac{e}{2E_b m}}=K_1 H \qquad (5)$$

The energy density $\mu$ of a magnetic field is $$\frac{BH}{8\pi}$$

or, a vacuum being the medium, (i. e. $B=H$)

$$\mu=\frac{H^2}{8\pi} \qquad (6)$$

The total energy in ergs (W) of the uniform magnetic field is the product of the energy density and the volume of the field, or $$W=\frac{H^2}{8\pi}v \qquad (7)$$

where $v$ is the volume of the field.

Since H is a difficult quantity to determine physically, it is convenient to use more readily measurable quantities, thus:

$$W=\frac{1}{2}Li^2\times 10^7 \text{ ergs}=K_2i^2 \qquad (8)$$

where $L$=inductance of the yoke
$i$=deflecting current

Substituting (8) in (7) and solving for H yields $$H=\frac{K_3i}{\sqrt{v}} \qquad (9)$$

Taking (9) and substituting it in (5) shows that $$\sin\phi=\frac{K_4i}{\sqrt{v}} \qquad (10)$$

Thus, in comparing a deflection yoke having a flared inner surface, in accordance with applicant's invention as described in Figures 1 through 4, to a conventional deflection yoke of cylindrical configuration, it follows that for the same deflection angle $2\phi$ and the same $K_k$ (same inductance and same length of yoke), Equation 10 can be expressed as $$\sin\phi=\frac{K_5i}{d} \qquad (11)$$

where $d$ is the average yoke diameter.

Equation 11 shows that the deflection angle (or the amount of deflection if the current is the same for the two tubes) varies inversely as $d$. Hence, it follows that less current is necessary with a tube constructed in accordance with applicant's invention to produce a deflection of the cathode-ray beam through the same angle as that of a standard cathode-ray tube. As an example of the increased efficiency, since $$W=K_2i^2 \text{ (Equation 8)}$$

and $$i=\frac{d\sin\phi}{K_5} \text{(Equation 8)}$$

and since the same deflection angle is used, the energy expression can be simplified as follows:

$$W=K_6d^2 \qquad (12)$$

It is now only necessary to find the average yoke diameter. From Figure 5, and assuming the neck diameter $d_1$ of a standard cathode-ray tube to be 1.5 inches, and the neck diameter $d_2$ of applicant's particular cathode-ray tube to be 1.02 inches, the following calculations can be made. In the case of applicant's tube, the dotted line approximation AB will be used instead of the actual curved boundary between these points, so that the total area is assumed to be EDABF. For the standard neck tube, the area is assumed to be BCEF. Such an approximation, however, is actually to the disadvantage of applicant's tube, inasmuch as it gives a larger result for $$\frac{d_2}{2}$$

than the true figure.

Using Equation 12 we now obtain the ratio $$\frac{W_2}{W_1}=\left(\frac{0.51}{0.75}\right)^2=0.462$$

between the energy required by the yoke in accordance with the invention to produce a given deflection and that required by a conventional yoke.

Thus, the flared yoke designed in accordance with the invention requires, in the example given, only 46.2% as much power as does the standard yoke for the same deflection. Actually, however, this 63.8% saving is lower than is obtained in practice, where a 75% reduction has been achieved. One reason for this is the triangular area approximation for the deflecting region, which has already been pointed out. Another factor is that the flared shape of the yoke causes the magnetic flux to be concentrated in the high-efficiency neck section lying near the line 26 in Figure 2. A full description of the effects of such a variation in flux density on yoke efficiency and beam focus will now be given.

In Figure 6 is shown a cross-sectional view of the coil unit 12 of Figure 3 taken along the line 6—6. As shown, the inner surface of the coil unit 12 defines a circle of radius $R_1$. The concentration of turns in any portion of this coil may be defined as the number of turns lying along a horizontal line passing through that portion of the coil. The location of such a line is conveniently specified in terms of the angle formed between a radius of the circle $R_1$, drawn to the point at which the horizontal line intersects the circle, and a second horizontal line through the center of the circle. In order that the field produced by the coil may be uniform, it is required that the concentration of turns should vary substantially proportionally to the cosine of this angle. This means, in effect, that, if the thickness of the coil measured along a horizontal line whose position corresponds to a value of $\theta$ equal to zero, is equal to $K_1$, then the thickness of the coil measured at any other point will be given by the expression: $K_1 \cos\theta$ as illustrated in Figure 6. This is the standard cosine distribution recognized in the art as being that which, in conventional arrangements, will produce a uniform flux across the neck of the cathode-ray tube.

As brought out above, however, it is desirable to alter this ideal field distribution in the exit portion of the yoke 10 for the purpose of correcting the pin-cushion distortion which results from the substantially flat viewing surface 20 of the cathode-ray tube 14. In order to develop such a slightly non-uniform magnetic field at the opposite end of the yoke 10 from that at which the cross-section 6—6 in Figure 3 is taken, the wire distribution at this exit end of the assembly may be substantially as shown in Figure 7. From this illustration, it will be seen that the inner surface of the coil 12 is, in cross-section, still circular in this region, but of a radius $R_2$ which is greater than the radius $R_1$ in Figure 6. The turns distribution in the side conductors 28 and 30 in this exit portion of the yoke is now altered so that it varies in a different manner than does the turns distribution in Figure 6. For example, in Figure 7 the distribution of turns of wire in the side conductors 28 and 30 is made to vary circumferentially as $K_2 \cos^2 \theta$, $K_2$ being the maximum thickness of each conductor. As will be seen from a comparison of Figures 6 and 7, the cosine squared turns distribution starts with a different thickness for the conductor and thins out at an appreciably different rate than does the cosine distribution.

It will now be seen that a deflecting yoke designed in accordance with the described embodiment of applicant's invention is arranged with the turns of wire in each oppositely-disposed pair of the coil units making up the complete yoke assembly so distributed that their concentration, in transverse cross-section, is a maximum at two points approximately 180° apart, the concentration of turns decreasing progressively from either of these points to a minimum at points angularly spaced approximately 90° to the points of maximum number. However, this circumferential turns distribution varies throughout substantially the entire length of each coil unit, being approximately proportional to the cosine of the increasing angle measured from the points of maximum number at one end of the yoke in a plane normal to the longitudinal axis of the yoke, and being approximately proportional to the cosine squared of the increasing angle measured from the points of maximum number at the other end of the yoke in a plane parallel to the first-mentioned plane.

While a preferred embodiment of applicant's invention has been illustrated and described, it will be recognized that the broad concept includes alternative structures for producing the particular deflecting fields desired. For example, instead of actually varying the turns distribution of the individual coil units, it is possible to insert spacers between the coils which separate them in such a way that the distance therebetween varies from one end of the yoke to the other.

It will also be understood that the yoke of Figure 1 is preferably provided with a flux return path consisting of a number of turns of wire arranged in helical form and overlying the outer vertical deflecting coil units 12b (Figure 4). However, this arrangement is a common expedient, and it is not believed necessary to set forth further details in connection therewith.

Having thus described my invention, I claim:

1. A deflecting coil for use with a cathode-ray tube and comprising a plurality of turns of wire arranged in the form of lumped conductors, each of the two side conductors of said coil being generally longitudinally disposed with reference to a common axis but being spaced a greater distance from said axis and from the remaining conductor at one end thereof than at the other, each of said side conductors also being bent convexly with respect to said axis throughout at least a portion of its length, and with each of the two end conductors of said coil being disposed substantially transversely with respect to said axis so that said end conductors exert relatively less deflecting effect than said side conductors.

2. A deflecting coil for use with a cathode-ray tube and comprising a plurality of turns of wire arranged in the form of lumped conductors, each of the two side conductors of said coil being generally longitudinally disposed with reference to a common axis but being spaced a greater distance from said axis and from the remaining conductor at one end thereof than at the other, each of said side conductors also being bent convexly with respect to said axis throughout at least a portion of its length to lie substantially in the surface of a hyperboloid of revolution the axis of which is substantially the same as said common axis, and with each of the two end conductors of said coil being disposed substantially transversely with respect to said common axis so that said end conductors exert relatively less deflecting effect than said side conductors.

3. A deflecting coil according to claim 2 in which said end conductors are bent concavely with respect to said common axis to lie substantially in the surface of the same hyperboloid of revolution as said side conductors.

4. A deflecting coil for use with a cathode-ray tube and comprising a plurality of turns of wire arranged in the form of lumped conductors, each of the two side conductors of said coil being generally longitudinally disposed with reference to a common axis but being spaced a greater distance from said axis and from the remaining conductor at one end thereof than at the other, each of said side conductors also being bent convexly with respect to said axis throughout at least a portion of its length to lie substantially in a surface of revolution the axis of which is substantially the same as said common axis, and with each of the two end conductors being disposed substantially transversely with respect to said common axis so that said end conductors exert relatively less deflecting effect than said side conductors.

5. A deflecting coil according to claim 4, in which the intersection of each of the said side conductors with a plane passing through the said common axis forms a line which, throughout at least a portion of its length, is the sector of a circle.

6. A deflecting yoke for a substantially flat-faced image-reproducing cathode-ray tube, said yoke including at least one pair of oppositely-disposed deflection coils each of which has a curved inner surface which at least in part is convex to the longitudinal axis of said cathode-ray tube, each coil being further characterized in that it has a circumferential turns distribution which varies from approximately cosine form in the portion of the coil nearest that section of the cathode-ray tube containing the beam-developing means to other than cosine form in that portion of the coil nearest the cathode-ray tube screen.

7. A deflecting yoke for a substantially flat-faced image-reproducing cathode-ray tube, said yoke including at least one pair of oppositely-disposed deflection coils each of which has a curved inner surface which at least in part is convex to the longitudinal axis of said cathode-ray tube, each coil being further characterized in that it has a circumferential turns distribution which varies from approximately cosine form in the portion of the coil nearest that section of the cathode-ray tube containing the beam-developing means to cosine squared form in that portion of the coil nearest the cathode-ray tube screen.

8. A yoke for an image-reproducing cathode-ray tube, said yoke including a pair of oppositely-disposed deflecting coils, said pair of coils being arranged so that in transverse cross-section the number of turns of wire is a maximum at two points approximately 180° apart, with a progressive decrease from either of these points to a minimum at points angularly spaced approximately 90° to the points of maximum number, said yoke being further characterized in that there is a variation in the circumferential turns distribution throughout substantially the entire length of each coil, this number being approximately proportional to the cosine of the increasing angle measure from the points of maximum number at one end of the coil in a plane normal to the longitudinal axis of the yoke, and being approximately proportional to the cosine squared of the increasing angle measured from the points of maximum number at the other end of the coil in a plane parallel to the first-mentioned plane.

9. A yoke for an image-reproducing cathode-ray tube, said yoke including a pair of oppositely-disposed deflecting coils, said pair of coils being arranged so that in transverse cross-section the number of turns of wire is a maximum at two points approximately 180° apart, with a progressive decrease from either of these points to a minimum at points angularly spaced approximately 90° to the points of maximum number, said yoke being further characterized in that there is a variation in the circumferential turns distribution throughout substantially the entire length of each coil, this number being approximately proportional to the cosine of the increasing angle measured from the points of maximum number at one end of the coil in a plane normal to the longitudinal axis of the yoke, and being approximately proportional to other than the cosine of the increasing angle measured from the points of maximum number at the other end of the coil in a plane parallel to the first-mentioned plane.

CARLO V. BOCCIARELLI.

REFERENCES CITED

The following references are of record in the file of this patent:

UNITED STATES PATENTS

| Number | Name | Date |
|---|---|---|
| 2,132,933 | Bowman-Manifold et al. | Oct. 11, 1938 |
| 2,151,530 | Ruska | Mar. 21, 1939 |
| 2,172,733 | Federmann et al. | Sept. 12, 1939 |
| 2,186,595 | Ruska | Jan. 9, 1940 |
| 2,207,777 | Blain | July 16, 1940 |
| 2,227,711 | Gunther | Jan. 7, 1941 |
| 2,237,651 | Bruche | Apr. 8, 1941 |
| 2,240,606 | Bobb | May 6, 1941 |
| 2,395,736 | Grundmann | Feb. 26, 1946 |
| 2,428,947 | Torsch | Oct. 14, 1947 |
| 2,455,171 | Haantjes | Nov. 30, 1948 |
| 2,565,331 | Torsch | Aug. 21, 1951 |

FOREIGN PATENTS

| Number | Country | Date |
|---|---|---|
| 496,812 | Great Britain | Dec. 5 1938 |